(12) United States Patent
Crook

(10) Patent No.: US 7,100,248 B2
(45) Date of Patent: Sep. 5, 2006

(54) FLEXIBLE TIE STRAP

(76) Inventor: Dale J. Crook, 13745 W. 121st Ter., Olathe, KS (US) 66062

( * ) Notice: Subject to any disclaimer, the term of this patent is extended or adjusted under 35 U.S.C. 154(b) by 0 days.

(21) Appl. No.: 10/764,959

(22) Filed: Jan. 26, 2004

(65) Prior Publication Data

US 2004/0154139 A1 Aug. 12, 2004

Related U.S. Application Data

(60) Provisional application No. 60/443,145, filed on Jan. 27, 2003.

(51) Int. Cl.
B65D 63/00 (2006.01)
A44B 11/25 (2006.01)

(52) U.S. Cl. ............... 24/16 PB; 24/596.1; 24/614; 24/DIG. 48

(58) Field of Classification Search ............ 24/16 PB, 24/163 R, 169, 170, 176, 178, 191, 198, 24/19, 17 A, 596.1, 633, DIG. 47, DIG. 48
See application file for complete search history.

(56) References Cited

U.S. PATENT DOCUMENTS

| | | |
|---|---|---|
| 1,086,442 A | 2/1914 | Cornelius |
| 2,936,980 A | 5/1960 | Rapata |
| 3,900,923 A | 8/1975 | Thomas |
| 3,979,094 A | 9/1976 | DeWitt |
| 3,991,444 A * | 11/1976 | Bailey ............... 24/16 PB |
| 4,128,220 A | 12/1978 | McNeel |
| 4,236,280 A * | 12/1980 | Kreiseder ............ 24/16 PB |
| 4,272,047 A | 6/1981 | Botka |
| 4,317,262 A * | 3/1982 | Wells, Jr. ............ 24/16 PB |
| 4,439,896 A * | 4/1984 | Matsui ............... 24/16 PB |
| 4,499,680 A | 2/1985 | Coburn |
| 4,557,455 A | 12/1985 | Benjamin |
| 4,705,245 A * | 11/1987 | Osada ................ 24/16 PB |
| 4,958,791 A * | 9/1990 | Nakamura ........... 24/16 PB |
| 5,224,244 A * | 7/1993 | Ikeda et al. ......... 24/16 PB |
| 5,293,669 A * | 3/1994 | Sampson ............. 24/16 PB |
| 5,524,463 A | 6/1996 | Schenkel et al. |
| 5,644,819 A * | 7/1997 | Lyons ................ 24/20 R |
| 5,687,456 A * | 11/1997 | Chang ................ 24/16 PB |
| 5,890,265 A | 4/1999 | Christian et al. |
| 6,185,791 B1 * | 2/2001 | Khokhar ............. 24/16 PB |
| 6,202,962 B1 | 3/2001 | Snyder |
| 6,226,839 B1 | 5/2001 | Sayegh |
| 6,355,887 B1 | 3/2002 | Gretz |
| 2001/0050325 A1 | 12/2001 | Dunay et al. |

* cited by examiner

*Primary Examiner*—Robert J. Sandy
(74) *Attorney, Agent, or Firm*—Thomas A O'Rourke; Bodner & O'Rourke

(57) ABSTRACT

A flexible tie strap includes an elongated narrow web with a fastener joined at one end. One surface of the web is equipped with a plurality of spaced apart ratchet teeth. The fastener includes an aperture to receive the free end of the web and a tongue with a pawl. The pawl is positioned to engage the web teeth to prevent withdrawal of the web through the fastener. A release tab and an anchor tab are joined to the fastener in spaced relation to each other for flexing the fastener to disengage the pawl from the teeth and release the strap from the fastener. The web of the strap may include a series of spaced apart holes to permit attachment of other devices to the strap.

14 Claims, 2 Drawing Sheets

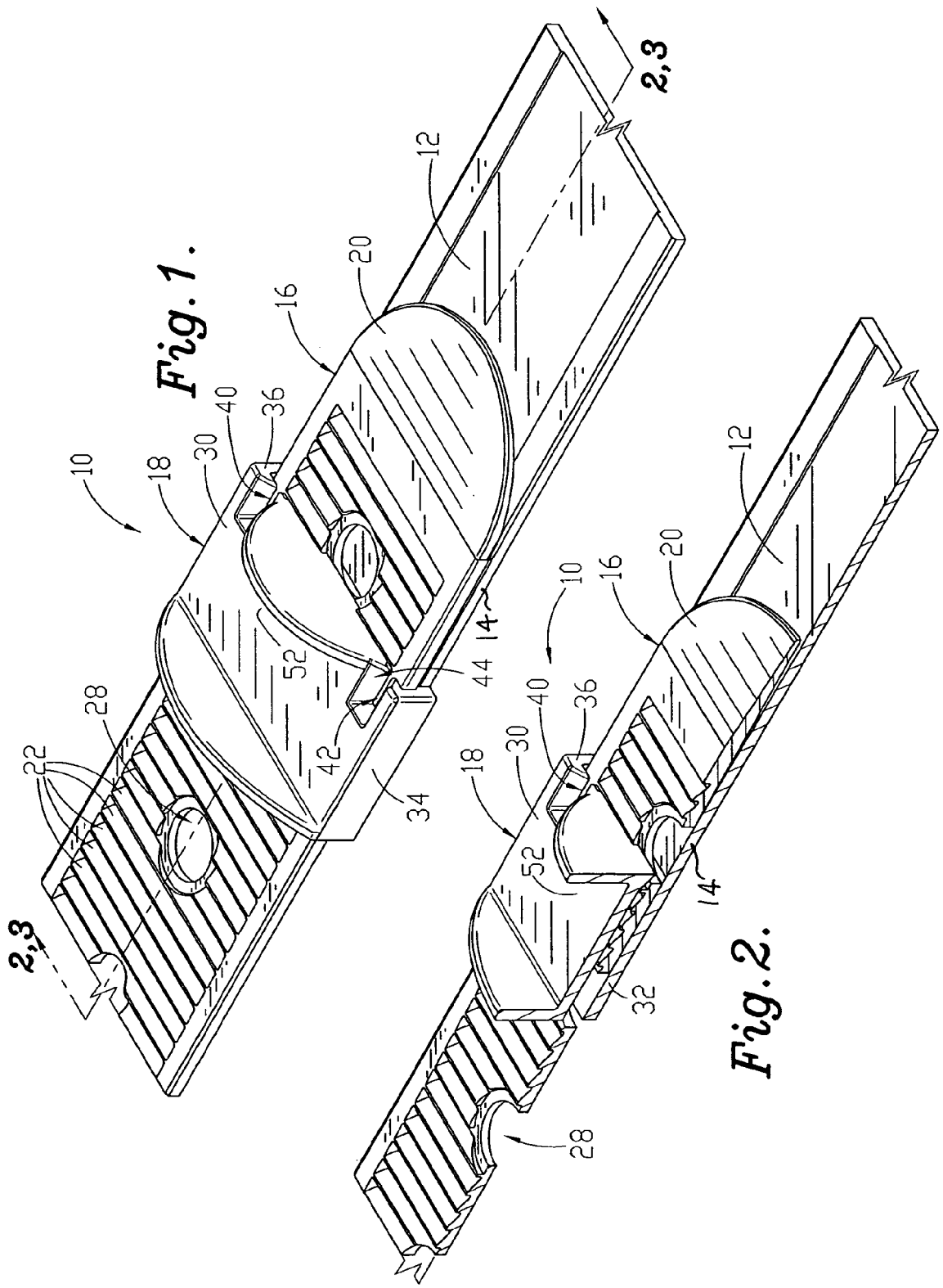

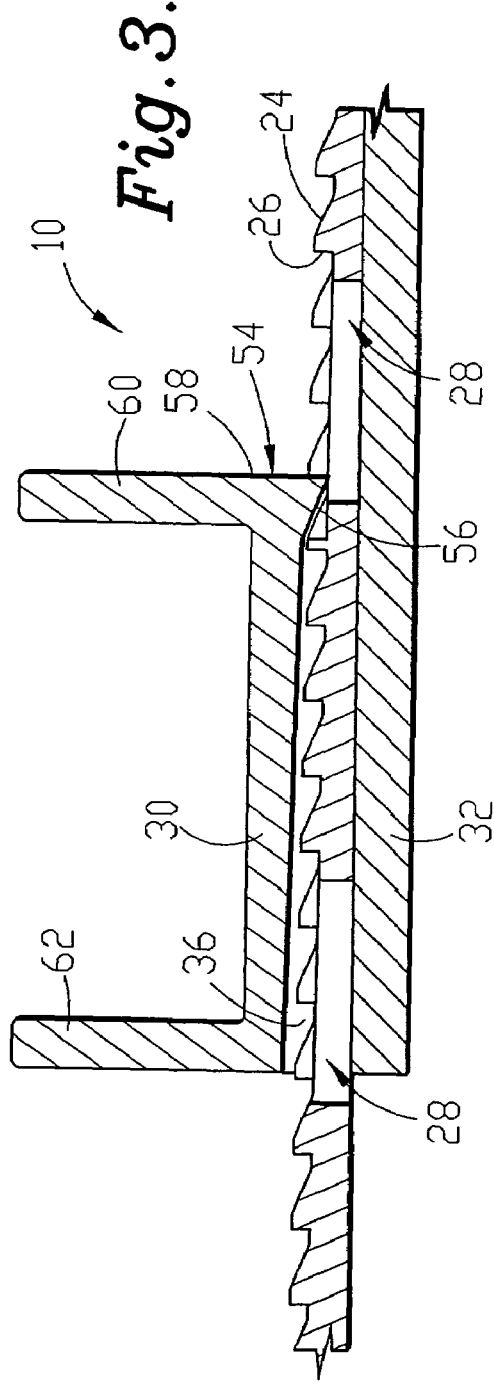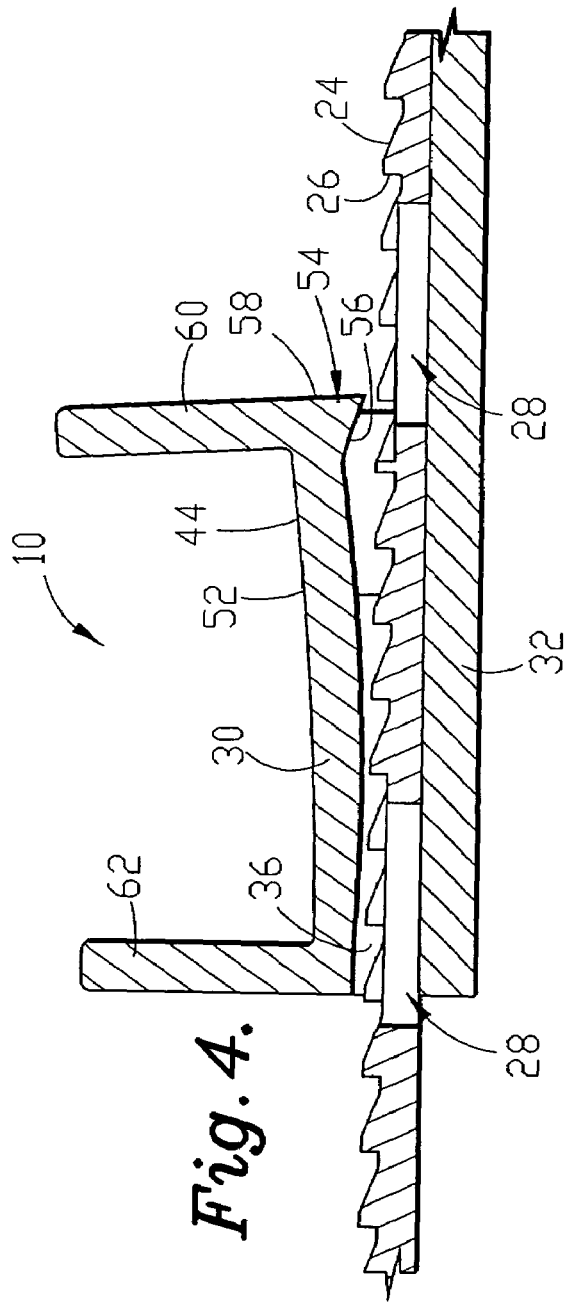

FLEXIBLE TIE STRAP

CROSS-REFERENCE TO RELATED APPLICATION

This application claims priority under 35 U.S.C. § 119(e) and 37 C.F.R. 1.78 (a) based upon U.S. Provisional Patent Application No. 60/443,145 entitled Flexible Tie Strap, which was filed on Jan. 27, 2003.

BACKGROUND OF THE INVENTION

The present invention is broadly concerned with a flexible tie strap used for supporting pipes, ductwork, wiring or the like. More particularly, it is concerned with a flexible tie strap having an adjustable fastener with a release mechanism for securing the tie strap to itself or to another strap.

Flexible tie straps are commonly employed to rig and support ductwork for heating, ventilating and air conditioning (HVAC) systems. They are also used as cable ties to support electrical wiring and fiberoptic cables. Such tie strap devices are typically of ratchet and pawl construction with parallel entry of a free end of the strap through a buckle member to form a loop which is used to encircle and support a pipe, duct or cable. One side of the strap includes ratchet teeth and the buckle member is equipped with a pawl. The free end of the strap is inserted through the buckle member and the pawl rides over the teeth as the strap is pulled through the buckle. The shoulder of the ratchet tooth adjacent the pawl locks the strap against reverse movement. Flexible tie straps of this construction are extremely effective in providing adjustable support without causing damage to flexible ducts and wires which easily might be crimped, bent or otherwise damaged by other types of hanger devices.

Once installed, such tie straps can be removed easily by clipping or cutting the strap. However, for some applications it is desirable to loosen and readjust the strap or to remove it entirely for reuse at a different location. Various attempts have been made to equip tie strap fasteners with release mechanisms. Such release mechanisms are not well configured for ease of operation and require substantial finger strength. They also generally require well developed manual dexterity, since they are not easily grasped. Operation of such release mechanisms can be facilitated by using a tool. However, it is preferred that the pawl be released manually, without resorting to use of a tool. During use, a tie strap and associated buckle are typically snugged against the duct or wire to be supported. Use of a tool to pry the pawl to a release position involves a risk that the tool will slip and cause damage to the adjacent duct or wire. Moreover, because the cost of flexible tie straps is relatively low, clipping and discarding a tie is the favored procedure where the fastener cannot be released quickly and easily. Collectively, this practice represents a not insubstantial waste.

There is thus a need for a flexible tie strap with a manual release mechanism that can be easily gripped using one hand to release the strap so that it can be withdrawn from the fastener for adjustment or removal without the use of a tool.

SUMMARY OF THE INVENTION

A flexible tie strap includes an elongated narrow web with a fastener joined at one end. One surface of the web is equipped with a plurality of spaced apart ratchet teeth. The fastener is apertured to receive the free end of the web and includes a tongue with a pawl. The pawl is positioned to engage the web teeth to prevent withdrawal of the web through the fastener. A release tab and a brace or anchor tab are joined to the fastener in spaced relation to each other for flexing the fastener to disengage the pawl from the teeth and release the strap from the fastener. The web of the strap may include a series of spaced apart holes to permit attachment of other devices to the strap.

Objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a fragmentary perspective view of an adjustable flexible tie strap in accordance with the present invention.

FIG. 2 is a fragmentary cross sectional view taken along line 2—2 of FIG. 1 and showing fastener construction details.

FIG. 3 is an enlarged fragmentary cross sectional view taken along line 3—3 of FIG. 1 and showing the fastener pawl engaging a ratchet tooth.

FIG. 4 is an enlarged fragmentary cross sectional view similar to that depicted in FIG. 3 and showing the release tab in a deflected position, the top wall of the fastener in a flexed position with the pawl in a lifted and disengaged position.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

A flexible tie strap in accordance with the present invention is generally designated by the reference numeral 10 and is illustrated in FIGS. 1 and 2 to include an elongate flattened web 12 of generally uniform width and having first and second ends 14 and 16. A fastener or clasp 18 is joined to the first end 14. The second or free end 16 terminates in a tip 20 which may optionally be rounded off or beveled in order to facilitate insertion into the fastener 18.

The web 12 includes on one surface a series of transverse, generally triangular ratchet teeth 22. The reverse surface of the web 12 may be smooth, or it may have a texture or pattern to facilitate gripping of the bundle to be supported. The teeth 22 are slightly angled toward the fastener 18, so that each includes a ramp side 24 and a shoulder side 26. The shoulder side 26 is generally orthogonal to the web 12 and faces the fastener 18, while the sloped ramp side 24 faces the free end 16. The web 12 also includes a series of longitudinally spaced apart apertures or holes 28 formed therethrough to enable securing the tie strap 10 to a support structure such as a joist or a beam or to receive hooks or other fasteners to enable suspension of items such as tags from the tie strap. It is foreseen that areas of the web 12 may be formed free of teeth 22 or holes 28 so as to provide a generally flat space for display of embossed, printed or applied advertising indicia (not shown).

The fastener 18 includes a top wall 30, bottom wall 32 and a pair of sidewalls 34 and 36 defining a generally rectangular channel or aperture 38 therethrough. The fastener walls 30, 32, 34 and 36 are sized for passage of the tie strap web 12 through the aperture 38. The forward portion of the top wall 20 includes a pair of laterally spaced slots or slits 40 and 42 which extend rearwardly to define a flexible tongue portion 44 therebetween. The tongue 44 includes a front margin 46, a pair of side margins 48 and 50 and a body portion 52. As best shown in FIGS. 3 and 4, the front 46 margin extends downwardly to form a generally triangular pawl 54. The pawl 54 includes an angled ramp side 56 facing the strap end 14 and an opposite shoulder side 58 which is collinear with the front margin 46 of the tongue 44 and generally orthogonal to the web 12. Alternatively, the pawl 54 may be positioned inboard from the leading edge of the tongue 44.

As best shown in FIGS. 1 and 2, the fastener top wall 30 includes a movable or release tab 60 and a fixed or anchor tab 62 in opposed spaced relation. The release tab 60 is joined in generally upstanding relation to the end of the tongue 44 and the anchor tab is joined in generally upstanding relation to the opposed end of the fastener 18. It is foreseen that in certain embodiments the anchor tab 62 may be omitted entirely. The anchor tab 62 may also be joined to the fastener top wall 30 in opposed relation to the release tab 62 at any spaced location on the fastener top wall 30 which is sufficient to permit room for sufficient deflection of the release tab 60 when it is urged toward the anchor tab 62 during use. It is understood that the upstanding tabs 60 and 62 need not necessarily be perpendicular to the fastener top wall 30, but may be angled toward or away from each other. The tabs 60 and 62 may be equipped with grip enhancers, for example ribs such as swaging, or patterns such as gnurling. While the upstanding margins of the tabs 60 and 62 are depicted in FIGS. 1 and 2 as being rounded off, they may also be constructed in any other suitable configuration. In other embodiments, a pair of opposed, generally horizontal extensions or levers (not shown) may be joined to the upstanding margins of the tabs 60 and 62.

The tie strap 10 is preferably constructed of a flexible synthetic resinous material, although any other suitable flexible material such as metal, leather, rubber, fabric or combination of such materials may be employed. The fastener 18 and web 12 are preferably of unitary or fusion welded construction. It is foreseen that when the web 12 is constructed of a material such as a woven textiles, the fastener 18 will be constructed of a flexible shape-retaining material such as synthetic resin, metal or similar material.

In use, a worker first forms the flexible tie strap 10 into a loop around a pipe, duct or bundle of wires so that the ratchet teeth 22 face outwardly. The user next aligns the strap tip 20 for parallel entry into the fastener 18, introduces the strap tip 20 into the fastener aperture 38 and urges it through. As the tip 20 emerges through the aperture 38, the ramp side 56 of the pawl 54 rides over the ramp side 24 of the ratchet teeth 22 adjacent the tip 20, enabling the web 12 to slide easily through the fastener 18 until the loop is tightened to a selected diameter and the user releases the free end 16 of the strap 10. The top and bottom walls of the fastener 30 and 32 maintain the pawl 54 in engagement with the ratchet teeth 22 (FIG. 2), so that the pawl shoulder 58 engages the shoulder 26 of an adjacent tooth 22 on the free end 16 side of the tie strap 10. The tooth shoulder 26 serves as a stop (FIG. 3), preventing withdrawal of the tie strap 10 from the fastener 18.

In order to loosen the tie strap 10 for adjustment or removal, a user grasps the release tab 60 and the anchor tab 62, preferably between the thumb and forefinger of one hand, and urges them together. The anchor tab 62 remains generally fixed in place, although some deflection may occur. The release tab 60 is deflected toward the anchor tab 62 (FIG. 4), which causes the tongue 44 to flex or retract upwardly which in turn shifts the pawl 54 upwardly, disengaging the ratchet tooth shoulder 26 from the pawl shoulder 58 and permitting the web 12 to slide backward through the fastener 18 to release the tie strap 10. The user may pull on the web 12 to withdraw it through through the fastener 18, or the user may permit the weight of the tied bundle to push against the tie strap 10 and cause loosening of the loop. Advantageously, the oppositely positioned anchor and release tabs 62 and 60 are easily actuated by a worker using two fingers of one hand, leaving the other hand free for use in withdrawing the web 12 through the fastener 18 or for use in performing other work.

Those skilled in the art will appreciate that alternatively the free end 16 of one tie strap 10 may be inserted into the fastener aperture 38 of a second tie strap 10 and the free end 16 of the second tie strap 10 similarly inserted into the fastener aperture 38 of the first tie strap 10. In this manner, two or more tie straps 10 can be intercoupled for use in rigging extremely large ducts or bundles.

It is to be understood that while certain forms of the present invention have been illustrated and described herein, it is not to be limited to the specific forms or arrangement of parts described and shown.

I claim:

1. An adjustable tie strap, comprising:
   (a) an elongated narrow web having first and second ends;
   (b) said web having a first edge and a second edge extending from said first and second ends, said web having between said edges and said ends thereof a plurality of spaced apart ratchet teeth each ratchet tooth having a base and an upper tooth surface, said base of said teeth forming a substantially closed surface between said edges and said ends, wherein said web includes a plurality of spaced apart holes formed therethrough;
   (c) said first end including a fastener having an aperture;
   (d) said fastener including a pawl positioned to engage one of said teeth to prevent withdrawal of said web from said fastener when said second end is inserted through said aperture; said holes being sized such that said pawl cannot be received by any one of said holes; and
   (e) a release tab coupled with said fastener for flexing said fastener to disengage said pawl from said one of said teeth for releasing said web from said fastener.

2. The adjustable tie strap as set forth in claim 1, wherein said holes having a diameter at least smaller than one half the width of the pawl.

3. The adjustable tie strap as set forth in claim 1, wherein:
   (a) said ratchet teeth are protrusions oriented transverse to said web.

4. The adjustable tie strap as set forth in claim 1, wherein:
   (a) said fastener is integral with said first web end.

5. The adjustable tie strap as set forth in claim 1, wherein:
   (a) said fastener includes a flexible tongue; and (b) said pawl is located on said tongue said pawl being substantially the same width as said teeth.

6. The adjustable tie strap as set forth in claim 5, further including: (a) an anchor tab extending from said fastener in spaced relation to said release tab.

7. The adjustable strap of claim 1, wherein said edges having a plurality of spaced apart ratchet teeth each of said ratchet teeth having a base a body portion and an upper tooth surface each of said body portions forming an acute angle with said base.

8. The adjustable tie strap as set forth in claim 1, wherein said ratchet teeth comprise a shoulder side and a sloped ramp side, said shoulder side being generally orthogonal to the web and faces said fastener while said sloped ramp side faces said second end.

9. The adjustable tie strap as set forth in claim 1, wherein said ratchet teeth comprise a shoulder side and a sloped ramp side, said shoulder side being generally orthogonal to the web and faces said fastener while said sloped ramp side faces said second end.

10. An adjustable tie strap, comprising:
- (a) an elongated narrow web having first and second ends and a top surface and a bottom surface, wherein said web includes a plurality of spaced apart holes formed therethrough;
- (b) said web including on a surface thereof a plurality of spaced apart ratchet teeth;
- (c) said first end including a fastener having an aperture, said aperture being disposed such that when said second end of said web passes through said aperture said bottom surface of said web contacts said top surface of said web;
- (d) said fastener including a pawl positioned to engage one of said teeth to prevent withdrawal of said web from said fastener when said second end is inserted through said aperture; said holes being sized such that said pawl cannot be received by any one of said holes; and
- (e) a release tab and an anchor tab positioned in spaced relation coupled with said fastener, and said release tab being positioned to flex said fastener to disengage said pawl from said one of said teeth for releasing said web from said fastener.

11. The adjustable tie strap as set forth in claim 10, wherein:
- (a) said fastener includes a top wall, a bottom wall and a pair of side walls;
- (b) said top wall being disposed parallel to said elongated narrow web, said top wall further including a flexible tongue; and
- (c) said pawl is located on said tongue.

12. The adjustable tie strap as set forth in claim 10, wherein said ratchet teeth comprise a shoulder side and a sloped ramp side, said shoulder side being generally orthogonal to the web and faces said fastener while said sloped ramp side faces said second end.

13. The adjustable tie strap according to claim 10, wherein said holes having a diameter at least smaller than one half the width of the pawl.

14. The adjustable tie strap according to claim 10, wherein said edges having a plurality of spaced apart ratchet teeth each of said ratchet teeth having a base a body portion and an upper tooth surface each of said body portions forming an acute angle with said base.

* * * * *